(12) United States Patent
Pelletier et al.

(10) Patent No.: US 8,600,046 B2
(45) Date of Patent: Dec. 3, 2013

(54) METHOD OF CODING A SECRET FORMED BY A NUMERICAL VALUE

(75) Inventors: Hervé Pelletier, Paris (FR); Isabelle Sengmanivanh, Paris (FR)

(73) Assignee: Sagem Securite, Paris (FR)

( * ) Notice: Subject to any disclaimer, the term of this patent is extended or adjusted under 35 U.S.C. 154(b) by 512 days.

(21) Appl. No.: 12/746,045

(22) PCT Filed: Dec. 5, 2008

(86) PCT No.: PCT/FR2008/052217
§ 371 (c)(1),
(2), (4) Date: Jun. 3, 2010

(87) PCT Pub. No.: WO2009/080950
PCT Pub. Date: Jul. 2, 2009

(65) Prior Publication Data
US 2010/0254531 A1    Oct. 7, 2010

(30) Foreign Application Priority Data
Dec. 7, 2007    (FR) ...................................... 07 08541

(51) Int. Cl.
*H04K 1/00*    (2006.01)
(52) U.S. Cl.
USPC ............... 380/28; 380/30; 380/46; 713/189; 713/190; 713/191; 713/192; 713/193; 713/194; 726/2; 726/22; 726/23; 726/26; 726/27; 708/200
(58) Field of Classification Search
None
See application file for complete search history.

(56) References Cited

U.S. PATENT DOCUMENTS 7,599,491 B2 * 10/2009 Lambert .................. 380/30
7,881,466 B2 * 2/2011 Gorissen et al. ............ 380/28

FOREIGN PATENT DOCUMENTS

| FR | 2 820 914 | 2/2001 |
| WO | WO-2006/046187 A1 | 5/2006 |
| WO | WO-2006/083179 A1 | 8/2006 |

* cited by examiner

*Primary Examiner* — Edan Orgad
*Assistant Examiner* — Canh Le
(74) *Attorney, Agent, or Firm* — Miller, Matthias & Hull LLP

(57) ABSTRACT

A method of coding a secret, a numerical value d, subdivided into a number N of secret elements $[d_i]_{n1}$, a composition law ($\otimes$) applied to the elements $d_i$ giving the value d. The following are calculated: (A) a first image ($T_N$) of the secret by iterative calculation and application of the law ($\otimes$) between the first image $T_{i-1}$ of rank i−1 and of the product according to this law of the element ($d_i$) of next rank and of a random value ($R_i$) of a first set, (B) a first numerical value ($S_1$) by application of the law ($\otimes$) to the N random values ($R_i$), (C) a second numerical value ($S_2$) by application of the law to the N−1 random values ($A_j$) of a second set, (D) a second image T' of the secret by application of the inverse law ($\otimes$) to the first image ($T_N$) and to the second numerical value ($S_2$) so as to generate an intermediate image (Tx) and then application of the inverse law to the intermediate image (Tx) and to the second numerical value ($S_2$). The random value ($A_j$) of corresponding rank is allocated (E) to the first N−1 elements ($d_i$) and the value of the second image (T') is allocated (E) to the last element ($d_N$). Application to secret or public key cryptography processes.

12 Claims, 4 Drawing Sheets

$$\otimes = \oplus \ ; \ \overline{\otimes} = \oplus$$
$$\otimes = + \ ; \ \overline{\otimes} = -$$

METHOD OF CODING A SECRET FORMED BY A NUMERICAL VALUE

CROSS-REFERENCE TO RELATED APPLICATIONS

This application is a U.S. national stage filing pursuant to 35 USC §371 of International Patent Application No. PCT/FR2008/052217 filed on Dec. 5, 2008, which claims priority under the Paris Convention to French Patent Application No. 07 08541, filed on Dec. 7, 2007.

The invention relates to a method of coding a secret, formed by a numerical value.

BACKGROUND OF THE DISCLOSURE

The considerable upsurge in communications by transmission of electronic messages has very quickly raised the problem of the confidentiality of the data transmitted.

Very sophisticated solutions for enciphering/deciphering these data have been proposed by means of encipherment algorithms using a single secret key, serving for encipherment/decipherment, and then a public key, with which is associated a private key, used for deciphering the data, enciphered by means of the public key.

The aforementioned solutions are satisfactory, to the extent that secret-key algorithms are hard to break, at the very least if the secret key is not compromised, and that public-key/private-key algorithms do not entail limitations as regards the dissemination of the public key and require the implementation of hardware and software means of prohibitive complexity and calculation cost with a view either to breaking the encipherment/decipherment algorithm or to retrieving the value of the private key associated with the public key.

In all events, use of a cryptographic scheme with a single secret key or a public key, with which a private key is associated, it is indispensable to prevent any compromising of the secret key or of the private key, so as to guarantee the confidentiality of the data transmitted.

Whilst satisfactory protected-access cryptographic components have been proposed, in particular integrated in the form of security processors for the cryptographic components of electronic cards, termed chip cards, exterior access by way of the input/output port to the security components of these electronic cards possibly being made extremely difficult or indeed practically impossible, the read/write manipulation of the secret or private keys by these components may allow the compromising of the aforementioned keys, in particular of the secret values or secrets entering into the definition of these values.

This compromising may occur through "hidden channel" attack (known as Side Channel attack), this type of attack possibly consisting for example in detecting the intensity variations of the electric current consumed by the security component or the card in the course of these manipulations, these being necessary.

The object of the present invention is to remedy the drawbacks of the risks of hidden channel attack, through the implementation of a method of coding a secret, subdivided into several mutually uncorrelated secret elements, it not being possible for the manipulation of the secret elements to enable the original secret to be retrieved, although each secret element might, as the case may be, be compromised.

SUMMARY OF THE DISCLOSURE

The method of coding a secret formed by a numerical value, in a secret-key or public-key cryptography scheme in which this secret is divided between a plurality of a determined number of elements, of which a composition law represents the value of this secret, which is the subject of the present invention, is noteworthy in that it consists, furthermore, in recalculating a new plurality of elements of the secret without ever manipulating this secret. For this purpose it is necessary to calculate a first image of this secret by iterative application of the composition law term by term between the first image of previous rank and the composition product according to this composition law of the element of next rank and a random value of the same rank, chosen from among a first set of one and the same plurality of random values; calculate a first numerical value, the composition product of this composition law applied successively to the random values of this first set of random values; calculate a second numerical value, the composition product according to this composition law applied successively to the random values of a second set of one and the same plurality minus one of random values; calculate a second image of this secret by applying the inverse composition law to the first image of this secret and to this second numerical value, so as to produce an intermediate image of this secret, and then by applying this inverse composition law to this intermediate image and to this first numerical value, so as to produce this second image of said secret; and allocate to each of these successive elements minus the last of this plurality of elements the random value of corresponding rank of this second set of at least one random value and to the last element the numerical value of this second image.

BRIEF DESCRIPTION OF THE DRAWINGS

The method of coding a secret, which is the subject of the present invention, will be better understood on reading the description and on observing the drawings hereinafter in which.

DETAILED DESCRIPTION OF THE DISCLOSURE

A more detailed description of the method of coding a secret, in accordance with the subject of the present invention, will now be given in conjunction with FIG. 1.

In a general way, it is recalled that the subject of the method, which is the subject of the invention, is the coding of a secret s formed by a numerical value d, in a secret-key or public-key cryptography scheme. It applies more particularly to any cryptographic calculation process in which the secret s is subdivided into a plurality of a determined number of secret elements, each denoted $d_i$, which plurality of elements is dubbed hereinafter $[d_i]_1^N$ of which a composition law denoted $\otimes$ represents the numerical value of the secret s.

Figure 1:
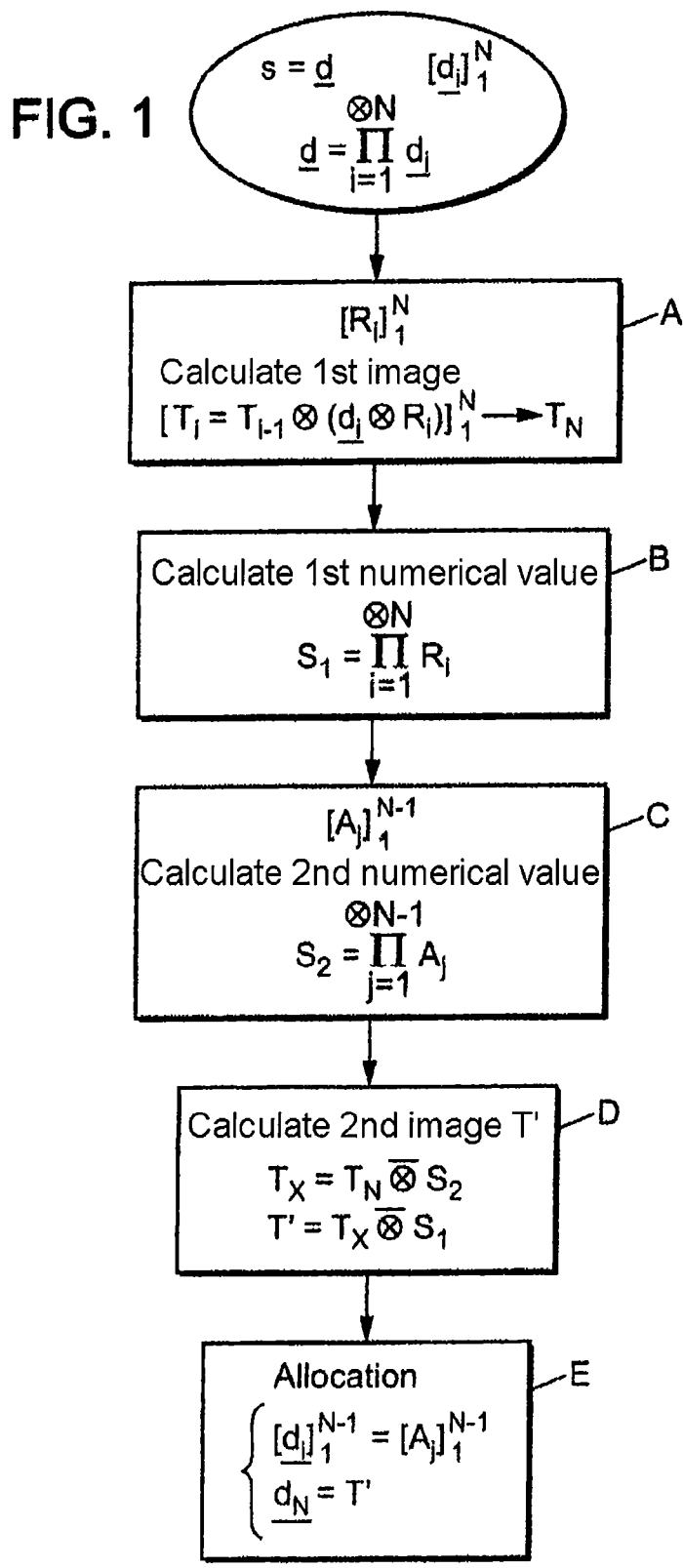
FIG. 1 represents, by way of illustration, a general flowchart for implementing the constituent steps of the method which is the subject of the invention.

With reference to FIG. 1, the secret s and the numerical value $\underline{d}$ representing the latter satisfy relation (1):

$$s = \underline{d}; [d_i]_1^N$$

$$\underline{d} = \overset{\otimes N}{\underset{i=1}{\pi}} d_i$$

In this relation $$\overset{\otimes N}{\underset{i=1}{\pi}} d_i$$

represents the composition product of the composition law $\otimes$ applied to the set of N elements $d_i$.

As represented in FIG. 1, the method which is the subject of the invention consists in calculating, in a step A, a first image of the secret s by iterative application of the composition law term by term between the first image of previous rank, denoted $T_{i-1}$, and the composition product, according to this composition law, of the element of next rank i, denoted $d_i$, and a random value, denoted $R_i$, chosen from among a first set of one and the same plurality of random values.

In step A of FIG. 1 the first set of one and the same plurality of random values is denoted $[R_i]_1^N$.

With reference to step A of FIG. 1, the operation of calculating the first image $T_N$ satisfies relation (2):

$$[T_i = T_{i-1} \otimes (d_i \otimes R_i)]_1^N \to T_N$$

In the above relation, $T_i$ denotes the first current image of rank i;

$T_{i-1}$ denotes the first previous image of rank i−1;

$d_i$ denotes the current element of rank i;

$R_i$ denotes the random value of rank i of the first set of random values;

$T_N$ denotes the first image obtained after iterative calculation.

Step A of FIG. 1 is followed by a step B consisting in calculating a first numerical value, denoted $S_1$, the composition product of the same aforementioned composition law applied successively to the random values of the previously mentioned first set of random values.

In step B of FIG. 1, the first numerical value $S_1$ satisfies relation (3):

$$S_1 = \overset{\otimes N}{\underset{i=1}{\pi}} R_i$$

Step B of FIG. 1 is followed by a step C consisting in calculating a second numerical value, denoted $S_2$, the composition product, according to the same aforementioned composition law, applied successively to the random values of a second set of one and the same plurality minus one of random values.

Consequently, the second set of one and the same plurality minus one of random values is denoted $[A_j]_1^{N-1}$.

The second numerical value satisfies relation (4):

$$S_2 = \overset{\otimes N-1}{\underset{j=1}{\pi}} A_j$$

Step C of FIG. 1 is then followed by a step D consisting in calculating a second image of the secret, denoted T'.

With reference to step D of FIG. 1, it is indicated that the aforementioned second image T' is calculated by applying the inverse composition law applied to the first image of the secret $T_N$ and to this second numerical value $S_2$, so as to produce an intermediate image denoted $T_x$, and then by applying this same inverse composition law applied to the intermediate image $T_x$ and to the first numerical value $S_1$, so as to produce the second image of the secret, denoted T'. The inverse composition law is denoted $\overline{\otimes}$.

In step D of FIG. 1, the calculation of the second image T' satisfies relation (5):

$$T_x = T_N \overline{\otimes} S_2$$

$$T' = T_x \overline{\otimes} S_1$$

Step D of FIG. 1 is then followed by a step E consisting in allocating to each of the successive elements of the plurality of elements $[d_i]_1^N$, minus the last, the random value of rank corresponding to the value of the second set of at least one random value, the set denoted $[A_j]_1^{N-1}$, and in allocating to the last element the numerical value of the aforementioned second image T'.

Consequently the step of allocations represented in step E satisfies relation (6):

$$\{[d_i]_1^{N-1} = [A_j]_1^{N-1}$$

$$\{d_N = T'$$

A more detailed description of a first and of a second variant for implementing the method which is the subject of the invention will now be given in conjunction with FIG. 2a and FIGS. 2b and 2c, respectively.

In a general way, it is indicated that the composition law mentioned previously is formed by a distributive arithmetic or logic operation, endowed with a neutral element. A corresponding composition law can thus be applied to any secret and to any element of a secret formed by a numerical value consisting either of an integer or of a real number.

Thus, under this assumption, for a secret s formed by a numerical value $\underline{d}$ of determined length L, each random value $R_i$ of the first respectively $A_j$ of the second set of random values is chosen of length less than $2^{L-N+1}$.

Figures 2A, 3:
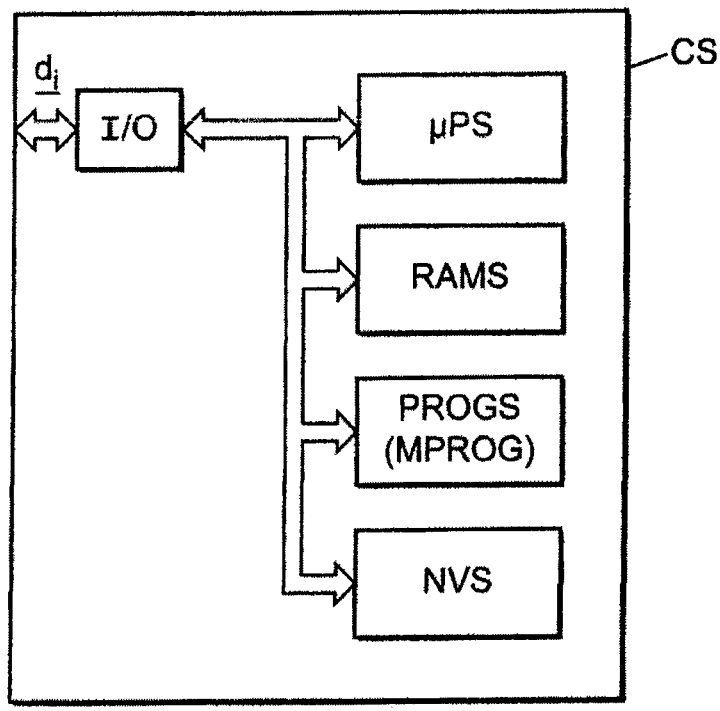
FIG. 2a represents, by way of illustration, a first and a second composition law applicable to numerical values and allowing the implementation of the method which is the subject of the present invention.
FIG. 3 is a functional diagram of a security component of a cryptographic device specially adapted for the implementation of the method which is the subject of the invention.

By way of nonlimiting example, the aforementioned composition law can consist, as represented in FIG. 2a, of an exclusive OR operation for example. It can furthermore consist of an arithmetic operation such as addition.

It is noted, of course, that the aforementioned composition law is then endowed with an inverse operation, the exclusive OR operation unchanged, when the exclusive OR operation constitutes the aforementioned composition law, respectively the subtraction operation, when the addition operation constitutes the abovementioned composition law.

The previously mentioned composition laws and their corresponding operation are represented in the drawing of FIG. 2a, illustrated by relation (7):

$$\otimes = \oplus; \overline{\otimes} = \oplus$$

$$\otimes = +; \overline{\otimes} = -$$

0

In the above relation,

⊕ represents the exclusive OR operation, conducted bitwise on the integers or real numbers constituting the secret elements or secret, as well as the random numbers;

+ and − represent the addition operation and the inverse operation of subtraction for the composition law formed by arithmetic addition. Furthermore the neutral element is 0 for both operations.

Figure 2B:
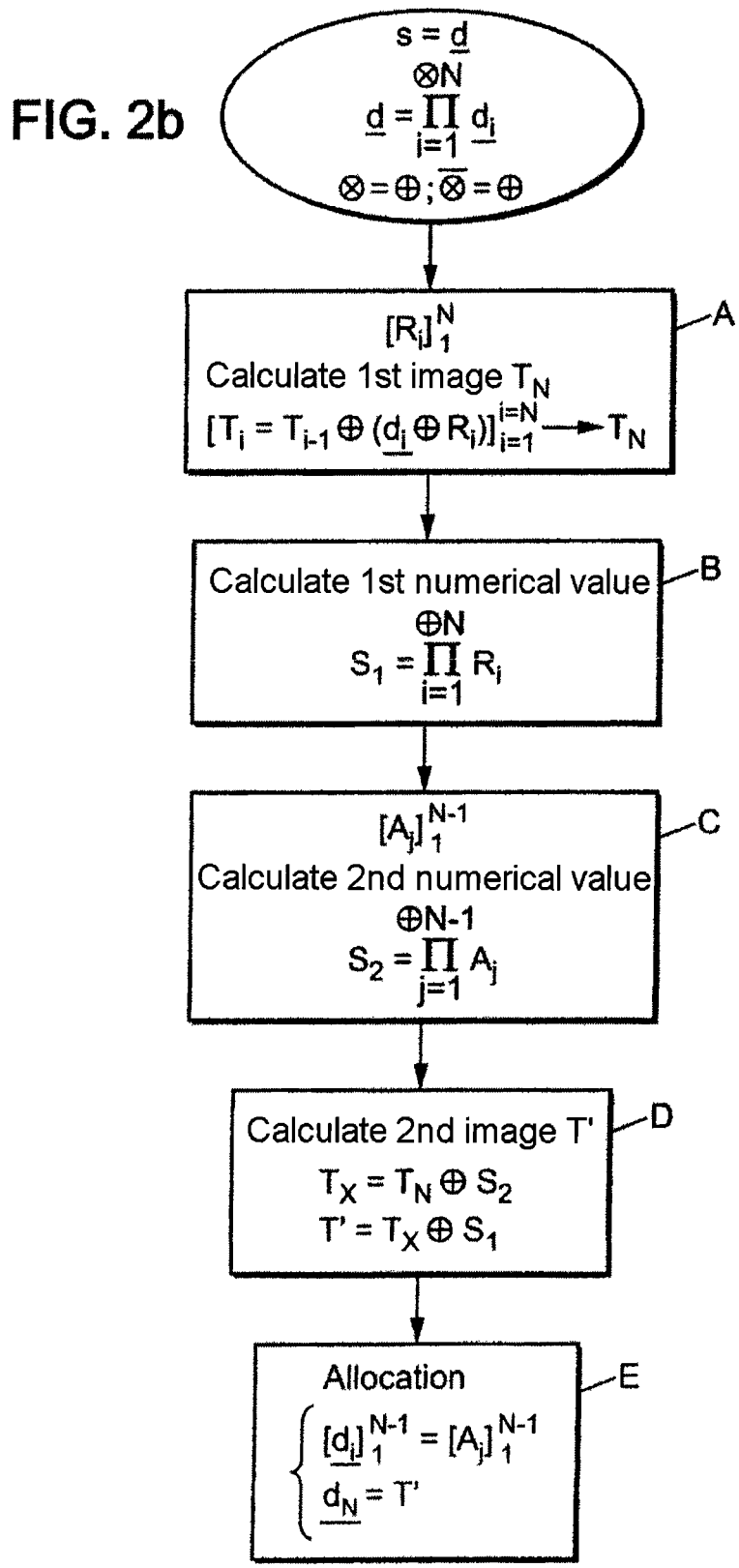
FIG. 2b represents, by way of illustration, a specific flowchart for implementing the method which is the subject of the invention, when the composition law represented in FIG. 2a is an exclusive OR operation.

A specific mode of implementation of the method which is the subject of the invention is now described in conjunction with FIG. 2b, in the case of the nonlimiting implementation of a composition law formed by the exclusive OR operation.

In step A of FIG. 2b, the operation of calculating the first image $T_N$ is given by relation (8):

$$[T_i = T_{i-1} \oplus (d_i \oplus R_i)]_{i=1}^{i=N} \to T_N$$

In step B of FIG. 2b, the operation of calculating the first numerical value is given by relation (9)

$$S_1 = \overset{\oplus N}{\underset{i=1}{\pi}} R_i;$$

In step C of FIG. 2b, the operation of calculating the second numerical value is given by relation (10):

$$S_2 = \overset{\oplus N-1}{\underset{j=1}{\pi}} A_j$$

In step D of FIG. 2b, the operation of calculating the second image T' is given by relation (11):

$$T_x = T_N \oplus S_2$$

$$T' = T_x \oplus S_1$$

Finally, the allocating step E is unchanged in relation to the allocating step E of FIG. 1.

Figure 2C:
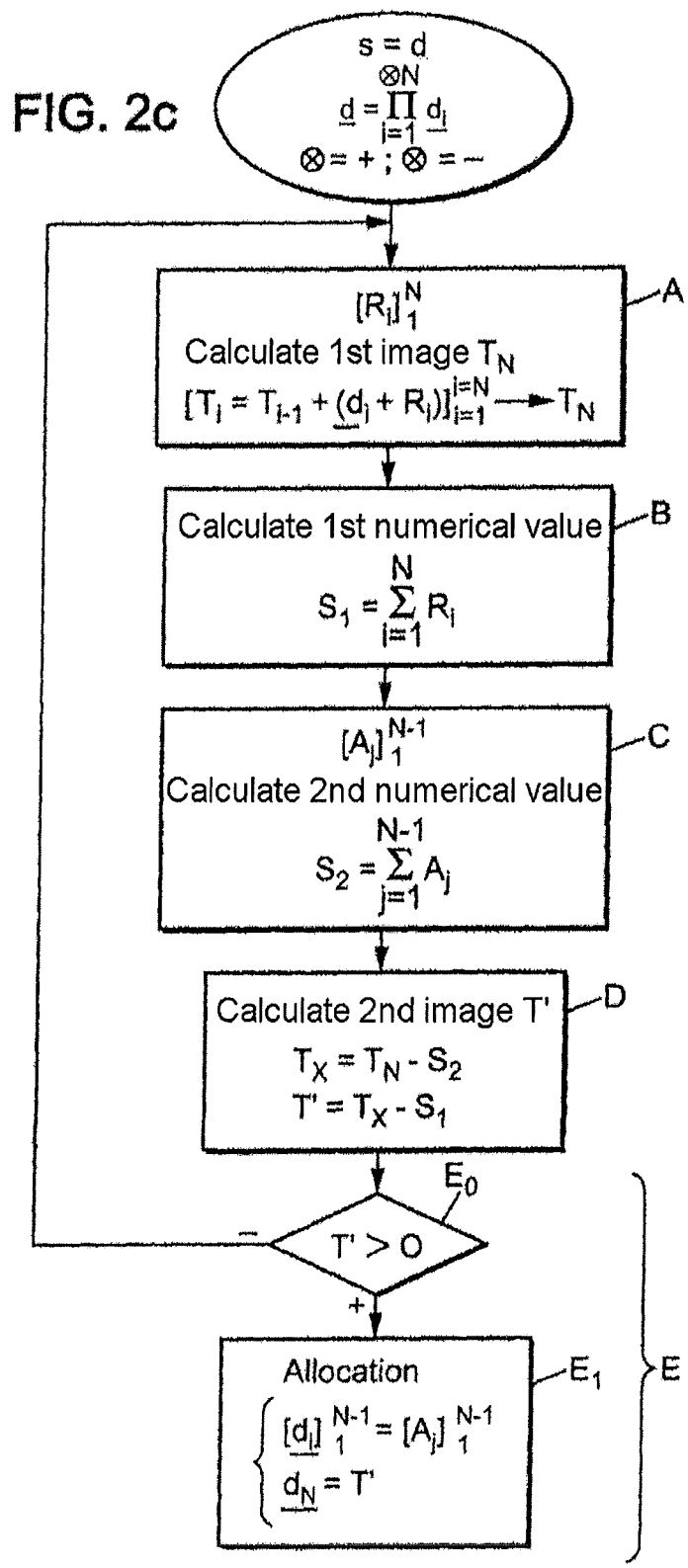
FIG. 2c represents by way of illustration a specific flowchart for implementing the method which is the subject of the invention, when the composition law represented in FIG. 2a is an addition operation.

Furthermore, by way of nonlimiting example the aforementioned composition law can consist, as represented in FIG. 2c, of an arithmetic addition operation.

In step A of FIG. 2c, the operation of calculating the first image $T_N$ is given by relation (12):

$$[T_i = T_{i-1} + (d_i + R_i)]_{i=1}^{i=N} \to T_N$$

In step B of FIG. 2c, the operation of calculating the first numerical value is given by relation (13):

$$S_1 = \sum_{i=1}^{N} R_i$$

In step C of FIG. 2c, the operation of calculating the second numerical value is given by relation (14):

$$S_2 = \sum_{j=1}^{N-1} A_j$$

In step D of FIG. 2c, the operation of calculating the second image T' is given by relation (15):

$$T_x = T_N - S_2$$

$$T' = T_x - S_1$$

With reference to FIG. 2c, it may be observed that the allocating step E of FIG. 1 is then subdivided into two sub-steps if each element di of the secret must be positive. This sub-step $E_0$ is a test of comparison of superiority of the second image T' with the zero value and a sub-step $E_1$ of allocating proper, which is also unchanged with respect to the allocating step E of FIG. 1.

The object of the test sub-step $E_0$ is to verify that the second image T' is significant. The significant character of the second image T' is obtained when the numerical value representative of the latter is strictly greater than zero.

Thus, upon a positive response to the comparison test of sub-step $E_0$, the allocating sub-step proper $E_1$ is called and carried out in the same manner as in the case of FIG. 1 or FIG. 2b.

Conversely, upon a negative response to the test sub-step $E_0$, the second image T' then being negative, a return to step A is executed so as to repeat the calculation process until a positive value representing the second image T' is obtained.

A description of a cryptographic device security component comprising a secure processor, a nonvolatile memory, a work memory, a program memory and a bus with read-write protected access will now be given in conjunction with FIG. 3.

In the aforementioned FIG. 3, the secure microprocessor is denoted μPS, the work memory is denoted RAMS, the program memory is denoted PROGS, the nonvolatile memory is denoted NVS and the internal bus is denoted I/O.

The security component which is the subject of the invention is noteworthy in that the program memory PROGS comprises a computer program including a series of instructions stored in this program memory.

During the execution of these instructions, the secure processor μPS executes the steps for implementing the method of coding a secret formed by the numerical value d in any secret-key or public-key cryptography scheme, as described previously in the description in conjunction with FIGS. 1 to 2b.

Thus, the security processor μPS delivers on the read-write protected access bus denoted I/O solely the secret elements denoted $d_i$ successively, under the supervision of the cryptographic device, not represented in the drawing of FIG. 3.

It is understood, in particular, that the method and the security component which are the subject of the invention operate on any secret formed by a numerical value d constituting totally or partially either a secret key in a secret-key cryptography scheme, or a private key in any public-key cryptography scheme.

Of course the aforementioned method and security component which are the subject of the invention may be implemented for the calculation of any value of access code, for identification with secret intent of an authentication, non-repudiation or signature process.

The invention claimed is:

1. A method of coding a secret formed by a numerical value d, in a secret-key or public-key cryptography scheme, in which the secret is subdivided into a plurality of a determined number N of elements $d_i$ of rank i, i being a rank varying between 1 and N, to which a composition law ⊗ is successively applied to obtain the numerical value d of said secret, said composition law ⊗ being formed by a distributive arithmetic or logic operation, endowed with a neutral element, said method being carried out by a security component of a cryptographic device, the security component comprising a bus with a read-write protected access, said method furthermore comprising:

calculating a first image $T_N$ of said secret by iterative application of the composition law ⊗ term by term between a first image $T_{i-1}$ of rank i−1, $T_o$ being a predefined arbitrary value, $T_i$ being a first current image of rank i, and a composition product according to said composition law ⊗ of the element $d_i$ of rank i and a random value $R_i$ of rank i, chosen from among a first set of a plurality of N random values $$[T_i = T_{i-1} \otimes (d_i \otimes R_i)]_{i=1}^{i=N} \rightarrow T_N;$$

calculating a first numerical value $S_1$ by successively applying said composition law ⊗ to said random values $R_i$ of said first set of N random values for i varying between 1 and N:

$$S_1 = \overset{\otimes N}{\underset{i=1}{\pi}} R_i;$$

calculating a second numerical value $S_2$, the composition product according to said composition law ⊗ applied successively to random values $A_j$ of a second set of N−1 random values $$S_2 = \overset{\otimes N-1}{\underset{j=1}{\pi}} A_j;$$

calculating a second image T' of said secret by applying an inverse composition law to said first image $T_N$ of said secret and to said second numerical value $S_2$, so as to produce an intermediate image $T_x$ of said secret, and then by applying said inverse composition law to said intermediate image $T_x$ and to said first numerical value $S_1$, so as to produce said second image T' of said secret $$T_x = T_N \overline{\otimes} S_2$$

$$T' = T_x \overline{\otimes} S_1$$

allocating to each of the first N−1 successive elements $d_i$ of said plurality of elements $[d_i]$ the random value $A_j$ of corresponding rank of said second set of at least one random value and to the element $d_N$ of rank N the numerical value of said second image T';

delivering on the bus with read-write protected access solely the elements $d_i$ successively, under the supervision of said cryptographic device.

2. The method as claimed in claim 1, wherein said logic operation is the bitwise exclusive OR operation.

3. The method as claimed in claim 1, wherein said distributive arithmetic operation is addition, the inverse composition law being formed by subtraction.

4. The method as claimed in claim 1, wherein for a secret formed by a numerical value d of determined length L, each random value $R_i$ of the first respectively $A_j$ of the second set of random values is chosen of length less than $2^{L-N+1}$.

5. The method as claimed in claim 3, wherein for an arithmetic operation formed by addition, said method furthermore comprises, prior to said step consisting in allocating, a comparison step for comparing superiority of the numerical value of said second image T' with the zero value, a positive response to said comparison step being followed by said step consisting in allocating, said comparison step being followed by a step of returning to said step consisting in calculating said first image $T_N$ of said secret for iteration of the method, otherwise.

6. The method as claimed in claim 1, wherein said secret formed by a numerical value d is either a secret key in a secret-key cryptography scheme, or a private key in a public-key cryptography scheme or else any value of access code, for identification with secret intent of an authentication, non-repudiation or signature process.

7. A security component of a cryptographic device comprising a secure processor, a nonvolatile memory, a work memory, a program memory and a bus with read-write protected access, wherein said program memory comprises a computer program including a series of instructions stored in said program memory, said secure processor being for coding a secret formed by a numerical value d, in a secret-key or public-key cryptography scheme, in which the secret is subdivided into a plurality of a determined number N of elements $d_i$ of rank i, i being a rank varying between 1 and N, to which a composition law ⊗ is successively applied to obtain the numerical value d of said secret, said composition law ⊗ being formed by a distributive arithmetic or logic operation, endowed with a neutral element, and wherein, during the execution of said instructions, said secure processor executes the steps of, calculating a first image $T_N$ of said secret by iterative application of the composition law ⊗ term by term between a first image $T_{i-1}$ of rank i−1, $T_o$ being a predefined arbitrary value, $T_i$ being a first current image of rank i, and a composition product according to said composition law ⊗ of the element $d_i$ of rank i and a random value $R_i$ of rank i, chosen from among a first set of a plurality of N random values $$[T_i = T_{i-1} \otimes (d_i \otimes R_i)]_{i=1}^{i=N} \rightarrow T_N;$$

calculating a first numerical value $S_1$ by successively applying said composition law ⊗ to said random values $R_i$ of said first set of N random values for i varying between 1 and N:

$$S_1 = \overset{\otimes N}{\underset{i=1}{\pi}} R_i;$$

calculating a second numerical value $S_2$, the composition product according to said composition law ⊗ applied successively to a random values $A_j$ of a second set of N−1 random values $$S_2 = \overset{\otimes N-1}{\underset{j=1}{\pi}} A_j;$$

calculating a second image T' of said secret by applying an inverse composition law to said first image $T_N$ of said secret and to said second numerical value $S_2$, so as to produce an intermediate image $T_x$ of said secret, and then by applying said inverse composition law to said intermediate image $T_x$ and to said first numerical value $S_1$, so as to produce said second image T' of said secret $$T_x = T_N \overline{\otimes} S_2$$

$$T' = T_x \overline{\otimes} S_1$$

allocating to each of the first N−1 successive elements $d_i$ of said plurality of elements $[d_i]$ the random value $A_j$ of corresponding rank of said second set of at least one random value and to the element $d_N$ of rank N the numerical value of said second image T', said security processor delivering on bus with read-write protected access solely the elements $d_i$, successively, under the supervision of said cryptographic device.

8. The security component as claimed in claim 7, wherein said logic operation is the bitwise exclusive OR operation.

9. The security component as claimed in claim 7, wherein said arithmetic operation is addition, the inverse composition law being formed by subtraction.

10. The security component as claimed in claim 7, wherein for a secret formed by a numerical value d of determined length L, each random value $R_i$ of the first respectively $A_j$ of the second set of random values is chosen of length less than $2^{L-N+1}$.

11. The security component as claimed in claim 9, wherein for an arithmetic operation formed by addition, said method furthermore comprises, prior to said step consisting in allocating, a comparison step for comparing superiority of the numerical value of said second image T' with the zero value, a positive response to said comparison step being followed by said step consisting in allocating, said comparison step being followed by a step of returning to said step consisting in calculating said first image $T_N$ of said secret for iteration of the method, otherwise.

12. The security component as claimed in claim 7, wherein said secret formed by a numerical value d is either a secret key in a secret-key cryptography scheme, or a private key in a public-key cryptography scheme or else any value of access code, for identification with secret intent of an authentication, non-repudiation or signature process.

* * * * *